United States Patent [19]

Masters

[11] Patent Number: 4,910,447
[45] Date of Patent: Mar. 20, 1990

[54] PULSE WIDTH MODULATOR MOTOR CONTROL

[75] Inventor: Stephen C. Masters, Alamogordo, N. Mex.

[73] Assignee: Scott Motors, Inc., Alamogordo, N. Mex.

[21] Appl. No.: 175,774

[22] Filed: Mar. 31, 1988

[51] Int. Cl.⁴ .............................. H02P 1/04; H02J 1/02
[52] U.S. Cl. ..................................... 318/599; 388/819; 388/903
[58] Field of Search ........ 318/341, 317, 318, 430–434, 318/599; 388/800–846, 903

[56] References Cited

U.S. PATENT DOCUMENTS

| | | | |
|---|---|---|---|
| 3,213,343 | 10/1965 | Sheheen | 318/341 |
| 3,716,767 | 2/1973 | Kuriyama et al. | 318/139 |
| 4,032,825 | 6/1977 | Kiimo | 318/139 |
| 4,150,324 | 4/1979 | Naito | 318/139 |
| 4,635,927 | 1/1987 | Shu | 318/341 X |
| 4,673,851 | 6/1987 | Disser | 318/341 |
| 4,705,997 | 11/1987 | Juzswik | 318/341 |

Primary Examiner—William M. Shoop, Jr.
Assistant Examiner—Paul Ip
Attorney, Agent, or Firm—Foley & Lardner

[57] ABSTRACT

A pulse width modulation control circuit includes a pulse width modulator which supplies a signal to a power switch tying together a d.c. signal generator and a motor and various sensing circuit including a control voltage disabler circuit, a motor voltage and current feedback circuit, and a low control voltage disabler circuit. All of the sensing circuits are appropriately designed to ensure that the various components of the circuit are not damaged under abnormal conditions whether due to motor loads heavier than rated or undesired changes in a.c. current input or control voltages.

10 Claims, 7 Drawing Sheets

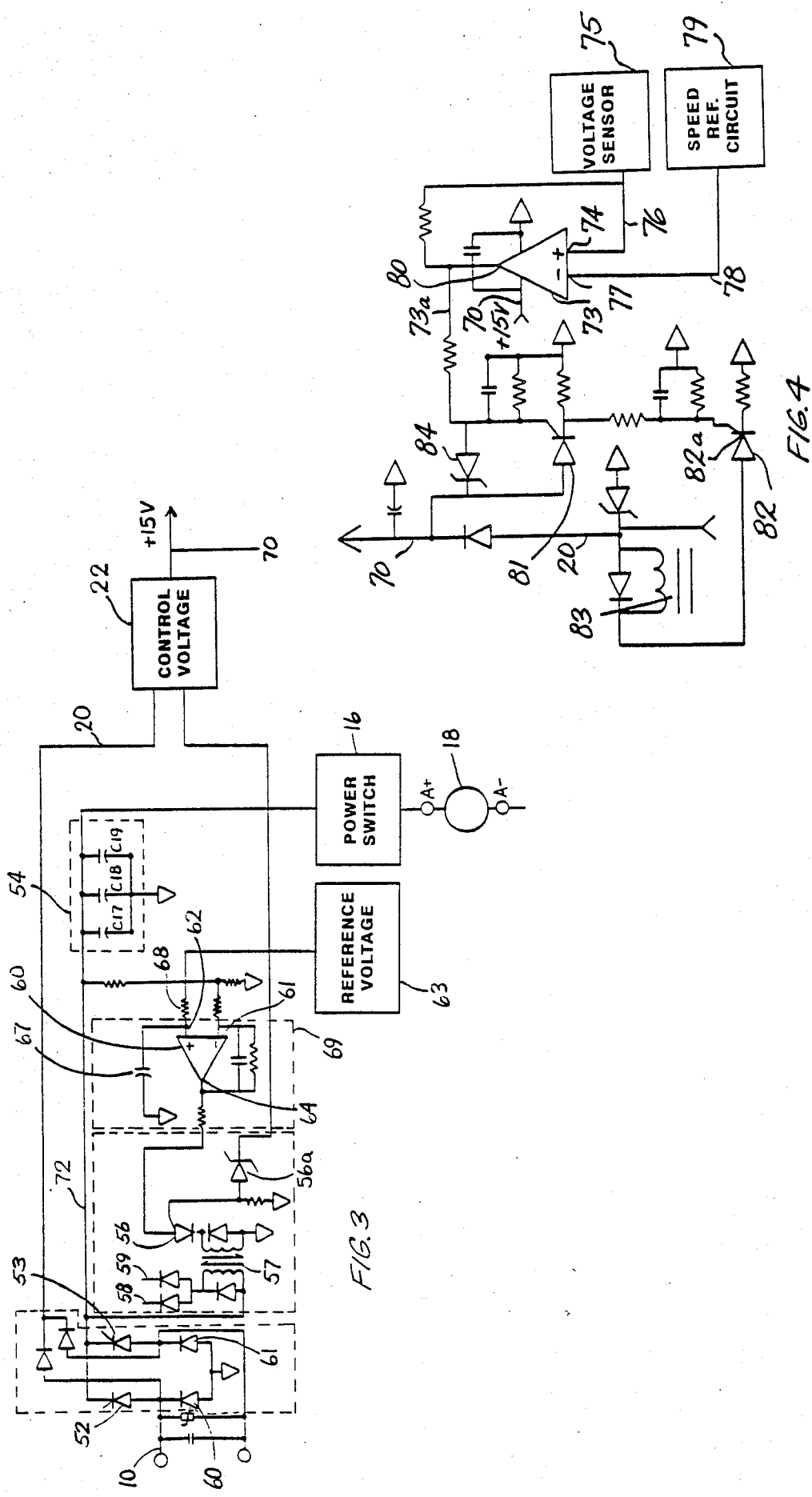

PULSE WIDTH MODULATOR MOTOR CONTROL

BACKGROUND OF THE INVENTION

This invention relates to pulse width modulated control system for a d.c. motor.

Control of motors by pulse width modulated signals is well known as described, for example, in U.S. Pat. No. 3,213,343 issued to Sheheen on Oct. 19, 1965. Such controls provide a superior way to smoothly accelerate and decelerate a d.c. motor under various circumstances. This is particularly advantageous when the motor is applied to a device such as an exercise treadmill or bed. It is particularly desireable to ensure operator comfort under a variety of possible circumstances such as fluctuating in the a.c. current input or failed components. Additionally, it is desirable to protect the other components in the circuit due to surges in current or voltage experienced under abnormal operating conditions of the product being operated by the motor.

Another important consideration in the operation of any pulse width modulation control system is the ability to transfer maximum power to the load through a power switch. Four factors that contribute to system losses are:

(1) input or driving power losses;
(2) saturation or static losses when the system is on;
(3) switching or dynamic losses that result from the transition times when the device is turned on and off; and
(4) off losses due to the product of leakage current and power supply voltage.

Since input power losses can be substantial for various semiconductors, the metal oxide -silicon field effect transistor or MOSFET has found increasing acceptance as a power switch device since it has an extremely high static input impedance which allows it to turn on with significantly less input power.

Still another desireable feature in any control system is to ensure that the bridge rectification components such as silicon controlled rectifiers are triggered accurately with appropriate sensitivity. It is important that the stability of the triggering device such as a programmable unijunction transistor be observed carefully. The above and other features are addressed by the circuit described below.

SUMMARY OF THE INVENTION

In accordance with a preferred embodiment of the present invention, a pulse width modulation control circuit comprises a pulse width modulator which supplies a signal to a power switch tying together a d.c. signal generator and a motor and various sensing circuit including a control voltage disabler circuit, a motor voltage and current feedback circuit, and a low control voltage disabler circuit. All of the sensing circuits are appropriately designed to ensure that the various components of the circuit are not damaged under abnormal conditions whether due to motor loads heavier than rated or undesired changes in a.c. current input or control voltages.

The d.c. signal generator incorporates components sensitive to fluctuations in the a.c. input and which provide consistent rectification and minimal d.c. current ripple. To this extent, use of silicon controlled rectifiers triggered by programmable unijunction transistors coupled with zener diodes have proven particularly effective.

The control voltage supplied to various components of the circuit can be disabled under various abnormal circumstances by the control voltage disabler circuit in accordance with the present invention. Such circumstances are the failure of the power switch, a surge of the control voltage above a predetermined level, a failure of the rectification components in the d.c. signal generator, or excess speed in the motor.

The simple but effective feedback circuits sense changes in motor voltage and current and the pulse width modulator in response to the signals generated by the circuits will increase or decrease the motor speed accordingly.

Finally, the low control voltage disabler circuit senses the control voltage below a predetermined minimum and generates a signal in response thereto. The pulse width modulator responds to the pressure of such signal and shuts off the power switch until the control voltage returns to a normal level.

BRIEF DESCRIPTION OF THE DRAWINGS

A preferred exemplary embodiment of the present invention will hereinafter be described wherein like numerals denote like elements and:

FIG. 3 is a schematic relating to the part of the circuit of FIG. 1 pertaining to the high voltage regulator and motor voltage.

FIG. 4 is a schematic relating to part of circuit of FIG. 1 pertaining to control voltage generator and control voltage disabler.

DETAILED DESCRIPTION OF THE PREFERRED EMBODIMENT

Figure 1:
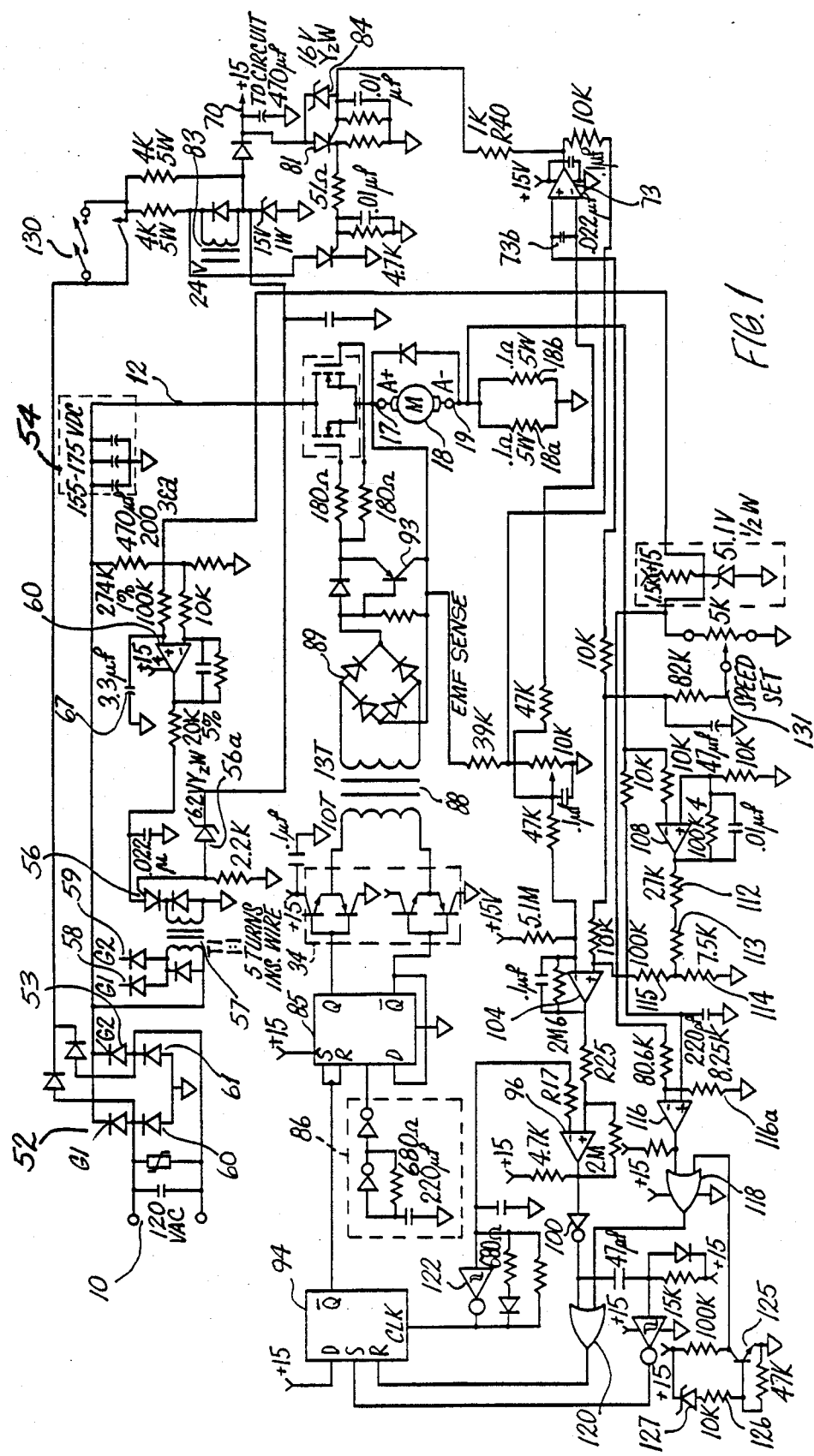
FIG. 1 is a schematic of a pulse width modulation circuit in accordance with a preferred embodiment of the present invention.

A detailed schematic of the circuit employed in accordance with the present invention is shown in FIG. 1. In order to clearly show the functional aspects of the circuit, reference is initially made to FIG. 2 which portrays in block diagram functional aspects of certain portions of the FIG. 1 circuit. It should be understood, however, the actual control device, in accordance with the present invention, when in operation, has many components and circuits which act in concert or overlap to provide the various functions portrayed in FIG. 2. Thus, when discussing the FIG. 2 block diagram, focus is made on functional aspects as opposed to actual circuits of the present invention.

Initially the a.c. input 10 is supplied to motor voltage output 12 where, under normal conditions, the a.c. signal is rectified and then filtered and supplied as a d.c. signal 14 to power switch 16. Unless power switch 16 is closed, the d.c. signal is not free to move to motor 18 which powers a remote device (not shown). A high voltage regulator circuit depicted by block 20 performs several important functions within the circuit of the present invention. Among its various important contributions, the high voltage regulator 20 provides an a.c. line disconnect, controls the voltage of the capacitors used to assist in providing the d.c. signal output 14 and provides a soft start to such capacitors and limits the surge on the a.c. input line.

The circuit of the present invention also generates a control voltage shown as block 22 to various components of the circuit. Control voltage which may have a value of about 15 volts d.c., provides necessary inputs to a number of components of the total circuit which, if shut off, would cause various functions within the circuit to cease. A control voltage disabler circuit 24 utilizes this particular feature in the event of any of several situations. The voltage disabler circuit 24 provides for the disablement of the control voltage in the event that components of power switch 16 fail which would otherwise permit the such d.c. current move unimpededly through line 17 to motor 18 possibly causing damage to motor 18 and the machinery it operates. Circuit 24 also closes down control voltage generator should the control voltage itself rise above 16 volts d.c. Additionally control voltage disabler 24 responds to disable the control voltage generator in the event that motor 18 overspeeds. Finally, disabler 24 will disable the control voltage 22 in the event any of the rectification components of motor voltage output 12 should fail. The main objective for using the control voltage disabler 24 within the circuit thus is to prevent excess speed in motor 18 and operation-forced overspeed of the remote equipment operated by motor 18.

To insure that motor 18 operates between a predetermined maximum and minimum levels, the power switch 16 must be controlled. To accomplish this, pulse width modulator generator (PWM generator) noted generally by numeral 28 within the dotted lines, provides a series of pulses to the power switch 16 which is in a conductive state during a pulse and a non-conductive state when a pulse is absent. The PWM generator 28 may be viewed as being comprised generally of three functional blocks. Initially, a digital pulse generator 30 provides a digital signal 32 to a square wave generator 34 which provides a series of square waves 36 to d.c. pulse generator 38 which rectifies the square wave received into a pulse width modulated d.c. signal 40 which is fed to power switch 16. As stated before, power switch 16 in response to the presence or absence of signal 38 opens or closes the conductive path of signal 14 through power switch 16 as d.c. signal 17 to motor 18. Generally, the longer power switch 16 is closed, the faster motor 18 operates.

The control circuit of the present invention further comprises a low voltage disabler circuit within block 30. The primary function of the low voltage disabler circuit is to ensure that the control supply voltage is high enough to drive power switch 16 on with the minimum required gate voltage. When the control voltage goes below a minimum predetermined level, low voltage disabler circuit closes down power switch 16.

Error sensor 42 provides the function necessary to maintain constant motor speed with changes in motor load through armature voltage feed back 44 and armature current feed back 46. Error sensor 42 detecting changes in signals 44 and 46 from a reference voltage provides an error signal 43 to digital pulse generator 30 which in response thereto provides digital signal containing information with respect to the error to square wave generator 34. In response thereto, square wave generator 34 provides square wave 36 with information concerning the error to d.c. pulse generator 38. Depending upon the information in signal 36, d.c. pulse generator provides a d.c. signal of varying pulse widths to power switch 16.

Figure 2:
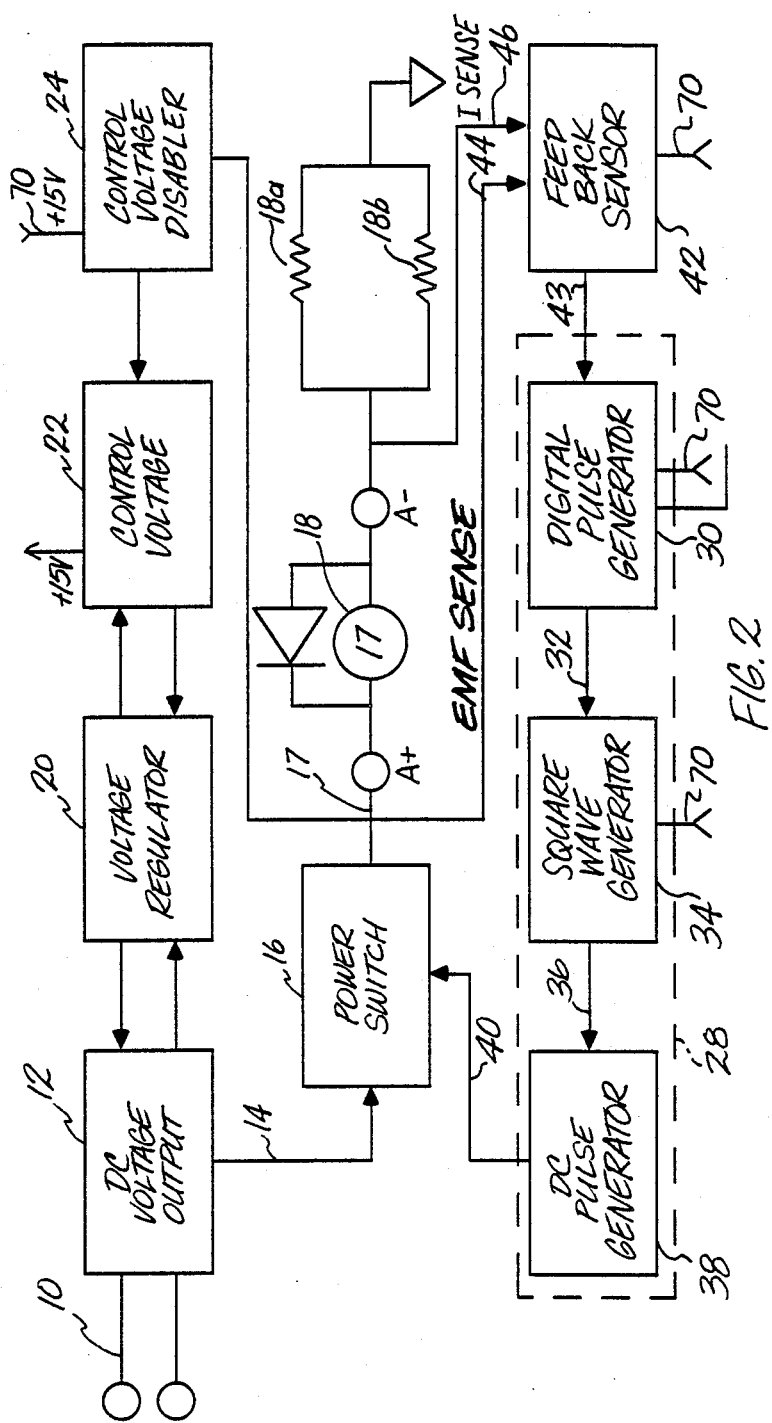
FIG. 2 is a block diagram of certain advantageous functional aspects of various circuit components of the FIG. 1 schematic.

Reference is now made to the circuit schematic of FIG. 3 which is generally that part of the circuit of FIG. 1 discussed in relationship to blocks 12 and 20 of FIG. 2. As illustrated, 120 volt a.c. input 10 feeds the line voltage to a pair of SCR's 52 and 53 which along with associated diodes 60 and 61 comprises a hybrid rectifying bridge. Both SCR 52, 53 are tied to a capacitor bank 54, comprised of 3 capacitors C17, C18 and C19, which in turn is tied directly to a power switch 16. A programmable unijunction transistor 56 is tied to transformer 57 connected to forward biased diodes 58, 59, both of which are respectively tied to the gates of SCR's 52 and 53. Operational amplifier 60 has an input pin 61 leading to capacitor bank 54 and providing a feed back voltage. Pin 62 of amplifier 60 is connected to reference voltage 63. Output pin 64 of amplifier 60 is tied to unijunction transistor 56. Operational amplifier 60 also receives a control voltage input 70 supplied by control voltage circuit 22 which may be 15 volts d.c. Amplifier 60 at pin 64 has an output which drives transistor 56 that in turn provides a pulse to the primary of transformer 57. A trigger pulse from the secondary is fed via diodes 58, 59 to SCR 52 and SCR 53. When SCR 52 and 53 are forward biased by the a.c. line input, they are turned on by the trigger pulse.

There are numerous devices which may be employed to trigger silicon controlled rectifiers. Among the more common triggers are the unijunction transistor, programmable unijunction transistors (PUT), silicon bilateral switches, diacs, sidacs and silicon unilaterial switches. The use of PUT in lieu of a unijunction transistor eliminates the need for certain resistors in triggering circuits. The trigger initiated by PUT 56 provides sensitive and unilateral triggering to SCR's 52 and 53. Referring again to FIG. 3, it should be noted that a zener diode 56a has been tied to the gate of PUT 56, the impedance of which significantly increases the stability of PUT 56.

This part of the circuit additionally provides for the rectification and filtering of the a.c. signal and for corrections due to a.c. line input variations which, if not corrected, may cause transistor voltage ratings being exceeded or undesired motor speed variations. The circuit maintains the voltage on capacitor bank 54 within a predetermined range. This is accomplished through operational amplifier 60 receiving an input at pin 61, i.e. a signal representing the voltage on capacitor bank 54, higher than the reference voltage input at pin 62. This in turn decreases the voltage output at pin 64 of amplifier 60. The lower voltage output delays the firing of transistor 56, causing the output of SCR 52, 53 to be lower and, consequently, the lowering of the voltage on capacitor bank 54.

In the event the line voltage drops to a predetermined minimum level, for example a value of 108 volts a.c., the SCR 51 and 52 are fired early in the a.c. cycle, e.g. about 2 milliseconds after the zero crossing of the a.c. line voltage due to the increased output from amplifier 60. On the other hand, an increase in line voltage to a predetermined maximum level, e.g. 130 volts a.c., then the output at pin 64 is lower, delaying the pulse from transistor 56.

To provide a controlled start up when power is applied, this portion of the circuit limits peak current through SCR 52 and SCR 53 and associated diodes 60 and 61. Pin 62 of amplifier 60 is tied to capacitor 67. Thus, reference voltage is ramped on capacitor 67 through resistor 68 in less than one-half second and using the first 5 to 20 cycles of the a.c. line to provide the soft start. The ramp function limits the peak current and protects the hybrid bridge circuit and capacitor bank 54 from high initial current surges.

In order to maximize operator safety, it is desireable that the entire circuit be shut down when certain events occur. For example, the circuit of the present invention provides advantageously for the disablement of the control voltage circuit when (1) the MOSFET transistor power switch 16 fails to the extent a short circuit therein results; (2) when control voltage 70 rises above predetermined maximum which may be, for example, 16 volts d.c.; (3) when motor 18 overspeeds; or (4) when the bridge circuit fails or the d.c. current is excessively rippled. The part of the circuit employed to accomplish this is shown generally in FIG. 4 (pertaining to functional blocks 12 and 24 of FIG. 2) with some of the components already having been described with reference to the control circuit. The major components of this circuit are voltage comparator 73 which has pin 74 tied to voltage sensor 75 which senses the voltage on the positive lead of the motor and provides an input signal 76 to pin 74. Pin 77 receives a speed reference input signal 78 from the speed reference circuit 79. Voltage comparator 73 has output pin 80 leading to the gate of SCR 81 which, in turn, is tied to the gate of SCR 82 connected to relay 83.

In the event that a failure of a component within power switch 16 occurs, the change in voltage causes the signal input 76 at pin 74 to go higher than the signal 78 input at pin 77 which in turn results in pin 80 going high triggering SCR 81 clamping control voltage 70 to a much lower voltage and biasing the gate 82a of SCR 82 which clamps relay 83 off. The control voltage 70 is then completely shut down, resulting in SCR 52 and SCR 53 ceasing to conduct which allows the capacitor voltage on capacitor bank 54 to fail thus cutting d.c. voltage output 72. The result is a reduction of motor speed or complete cessation until the problem within power switch 16 is remedied. Should an operator of the equipment being driven by the motor attempt to force the equipment to exceed predetermined r.p.m., then voltage input 76 would again exceed input signal 78 resulting in the shut down of the d.c. output 72.

To prevent damage to the various integrated circuits such as, for example, CMOS circuits due to excessive rises in control voltage, zener diode 84 is tied to control voltage 70 and activates SCR 81 which, as before, clamps the control voltage 70 to a lower value turning on SCR 82, thus unlatching relay 83, resulting in the cut back in d.c. output 72.

Finally, the d.c. output 72 is also shut down in the event that SCR 52 or 53 fails to properly rectify causing excessive rippling to capacitor bank 54 and resulting a ripple in excess of 30 volts d.c. at the positive lead A+ of the motor. Again, input signal 76 exceeds input signal 78 at voltage comparator 73 resulting in the eventual shutting off of control signal 70 and therefore d.c. output 72.

Figure 5:
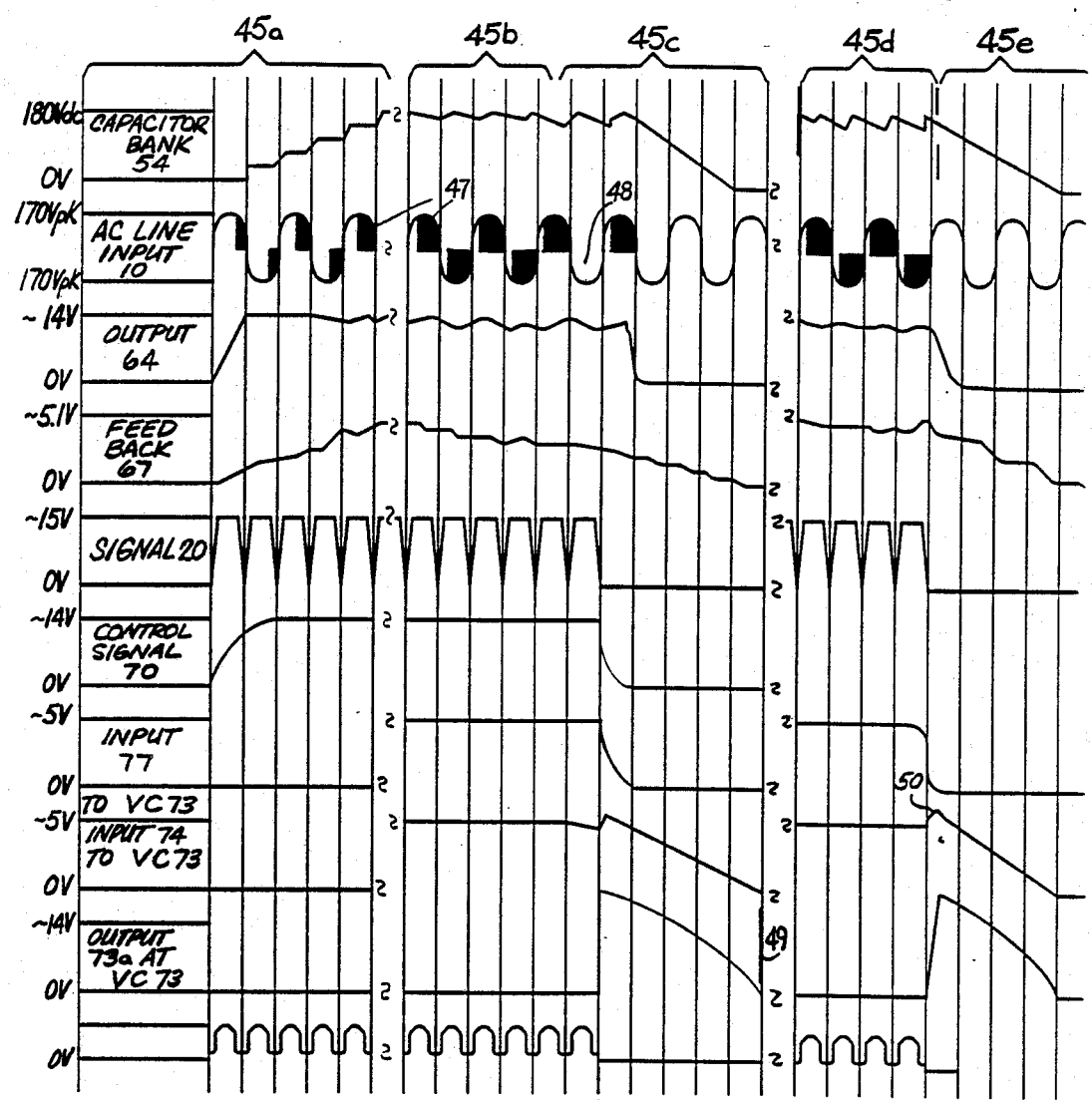
FIG. 5 is a timing diagram of the various components set forth in FIGS. 3 and 4.

The time diagram of FIG. 5 depicts the time sequence of events which occur under the various conditions described in reference to the schematics of FIGS. 3 and 4. As the circuit is turned on (as denoted under bracket 45a) capacitor bank 54 begins to ramp up to its peak value and the a.c. line voltage input 10 is fed to SCR's 51 and 52. The conduction angle noted by the numeral 47 and superimposed in dark on the sine wave of a.c. output 10 becomes increasingly large. Output 64 of amplifier 60 similarly quickly reaches a maximum value. Pulsating d.c. signal 20 to control voltage circuit 69 is also quickly generated, resulting in the generation of control voltge 70. In the portion of the time diagram indicated under bracket 45b, the conduction angle has reached its maximum. When one of the SCR's 52 or 53 misfire as indicated by the absence of a conduction angle shown by numeral 48 under bracket 45c, signal 73a from voltage comparator 73 suddenly peaks, causing SCR 82 to fire resulting in the shut off of relay 83. Signal 20 and therefore control voltage 70 immediately drop, resulting in the shut off of SCR's 52 and 53. Verticle line 49 indicates that motor 18 has been stopped.

Bracket 45d portrays again a normal full speed timing diagram until a short occurs in the power switch 16. As seen under bracket 45e, there is a brief upswing in motor 18 as indicated by the peak 50 in signal 74. Again signal 73a peaks and declines, causing SCR 82 to again fire, resulting in the shut off of SCR's 52, 53 and cessation of motor 18.

Figure 6:
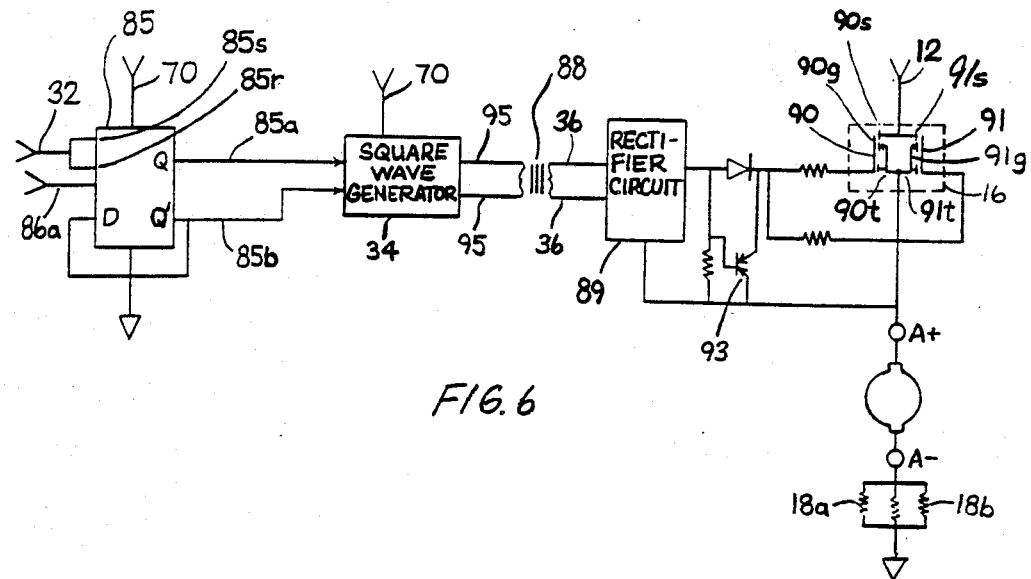
FIG. 6 is a schematic of that portion of FIG. 1 pertaining to the power switch, and pulse width modulator.

Referring to FIG. 6, which is a schematic incorporating the functions indicated by blocks representing power switch 16, square wave generator 34 and pulse generator 38, it may be seen that the power switch 16, which is a pair of MOSFET transistors 90 and 91, is set forth in a circuit which isolates gates 90g and 91g from common control. The circuit provides for the MOSFET gates 90g and 91g to be ground referenced to the source terminals 90t and 91t which are at the A+ or positive lead 17 of motor 18 and not grounded. The MOSFET transistors, which may be of a type known as IRF640 available from Siliconix or General Electric, float on the d.c. output or supply voltage 72 which for 120 a.c. current input is in the range of 125–180 volts d.c. Applicant has found that such an arrangement provides extremely quick power switch responses.

The circuit set forth in FIG. 6 has a flip-flop 85 having the set 85s and reset 85r pins tied together for receiving a digital pulse and a clock pulse 86a. The flip-flop 85 is operated by reference voltage signal 70. The signal outputs 85a and 85b are clocked out from the Q and $\overline{Q}$ pins to square wave generator 34 which may comprise a pair of totem pole transistors or an equivalent circuit compatible to provide an essentially square wave over lines 95 to a transformer 88. Such square wave prevents tranformer 88 from saturating. The power consumption required is advantageously low and in the range of 15–20 milliamperes. An isolated voltage is then produced on the secondary and via bridge rectifier 89, for example, a diode bridge rectifier, is ramped up on gates 90g and 91g in about 2 microseconds. The voltage on gates 90g, 91g then falls when the signal outputs 85a, 85b of Q and $\overline{Q}$ go high in about 2 to 3 microseconds. Transistor 93 keeps both gates 90g, 91g clamped near zero volts when signal outputs 85a, 85b respectively of Q, $\overline{Q}$ pins are high. Thus, the gate voltage is either on at about 12–14 volts d.c. or off below about 2 volts d.c. Thus, the gates cannot float with this type of drive circuit.

The current draw requires that the input of transformer 88 is through the bridge rectifier 89 and secondary of transformer 88. This is a maximum at the turn on of MOSFETS 90, 91 as the gates 90g, 91g are charging up requiring only the aforementioned 15 to 20 milliampers. When flip-flop 85 reset and set inputs 85r and 85s are low, Q and $\overline{Q}$ signal outputs 85a and 85b are clocked out alternately high and low and are employed to generate a square wave signal to transistor 34. In turn, under normal conditions, rectifier 89 provides the even width d.c. pulses to gate 90g and 91g.

Figure 7:
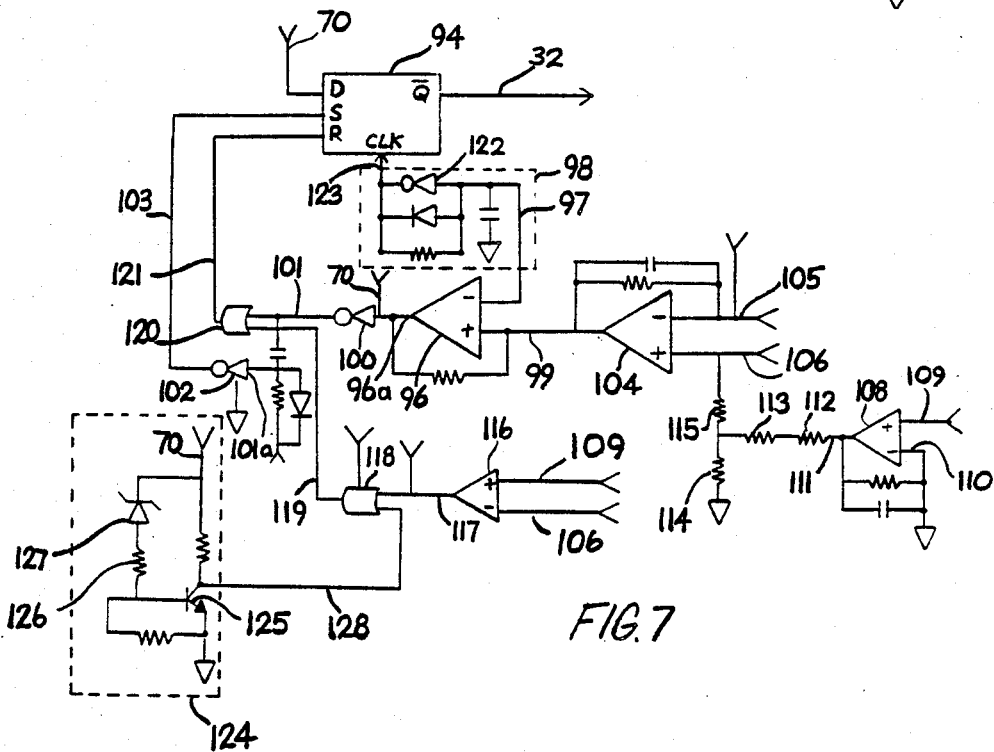
FIG. 7 is a schematic of that portion of FIG. 1 pertaining to the pulse width modulator, error sensor and low control voltage disabler.

As illustrated in the schematic of FIG. 7, the low output of $\overline{Q}$0 of flip-flop 94 is clocked out low as long as flip-flop 94 is set by input signal 103. To set flip-flop 94, comparator 96 compares sawtooth signal 97 supplied by sawtooth clock generator 98 to error voltage signal 99. When signal 99 is higher than signal 97, the output signal 96a of comparator 96 goes high to the input of inverter 100 with a resultant low output signal 101 being sent to the input inverter 102 momentarily, Output signal 103 from inverter 102 goes high for about 500 nanoseconds, setting flip-flop 94 on the leading edge of the 500 nanosecond pulse.

A particularly advantageous function of the control circuit provided in accordance with the present invention is the ability of the circuit to maintain constant motor speed with changes in motor load through both armature voltage feed back and armature current feed back without resort to the use of tachometers or the like complicated associated circuitry. This is accomplished (as best seen in FIG. 7) through sensing the armature voltage at the A+terminal of the motor and through the simultaneous sensing of the armature current at the negative lead of the motor. The sensed voltage signal 105 is supplied to the inverting input of operating amplifier 104. Operational amplifier 108 receives voltage feedback signal 109 representing the armature current. The output signal 111 of amplifier 108 is divided by resistors 112, 113 and 114 and then supplied by resistor 115 along with speed reference voltage signal 106 which is summed by amplifier 104. Speed reference signal 106 is taken from potentiometer 131 as best seen in FIG. 1. Output signal 99 which is the error signal input to comparator 96 being larger than sawtooth signal causes output 96a to remain high. The larger the value of signal 99, the wider the output pulse 40 is to power switch 16 thus resulting in gates 90g, 91g to remain on longer and providing a large d.c. input pulse to motor 18. Thus, motor 18 spins faster as more current is supplied for the heavier loads.

When the duty cycle is at 100%, flip-flop 94 remains set unless the current limit is exceeded. However, should the predetermined current limit be exceeded, output 117 of comparator 116, which compares the current feedback voltage 109 to current limit reference signal 106, goes high causing output signal 119 of OR gate 118; to go high and therefore the output signal 121 of, OR gate 120 to go high, signal 121 then resets flip-flop 94 which causes output 32 from $\overline{Q}$ to be high, resulting in slowing of motor 18. Additionally, since the circuit was terminated because of excessive current, flip-flop 94 will not receive a pulse necessary to set flip-flop 94. Set, however, is accomplished through the output 123 of inverter 122 (in sawtooth generator 98). Output 123 is about 0.5 microseconds at low output. This, therefore, insures that flip-flop 94 receives a pulse every cycle irrespective of the duty cycle and when the current limit mode is in effect. Additionally, protection is provided to the control circuit of the present invention by low voltage disable circuit shown generally within the dashed lines noted by numeral 124 in FIG. 7. It is important that reliable operation of the circuit be assured when the control voltage goes below a predetermined minimum such as about 11 volts d.c. Should this event occur, transistor 125 will not be forward biased by resistor 126 and diode 127 resulting in the output signal 119 of OR gate going high, resulting in the resetting of flip-flop 94. This in turn results in the reduction of gate voltage at MOSFETS 90 and 91 and the consequential turn off of the MOSFETS.

Figure 8:
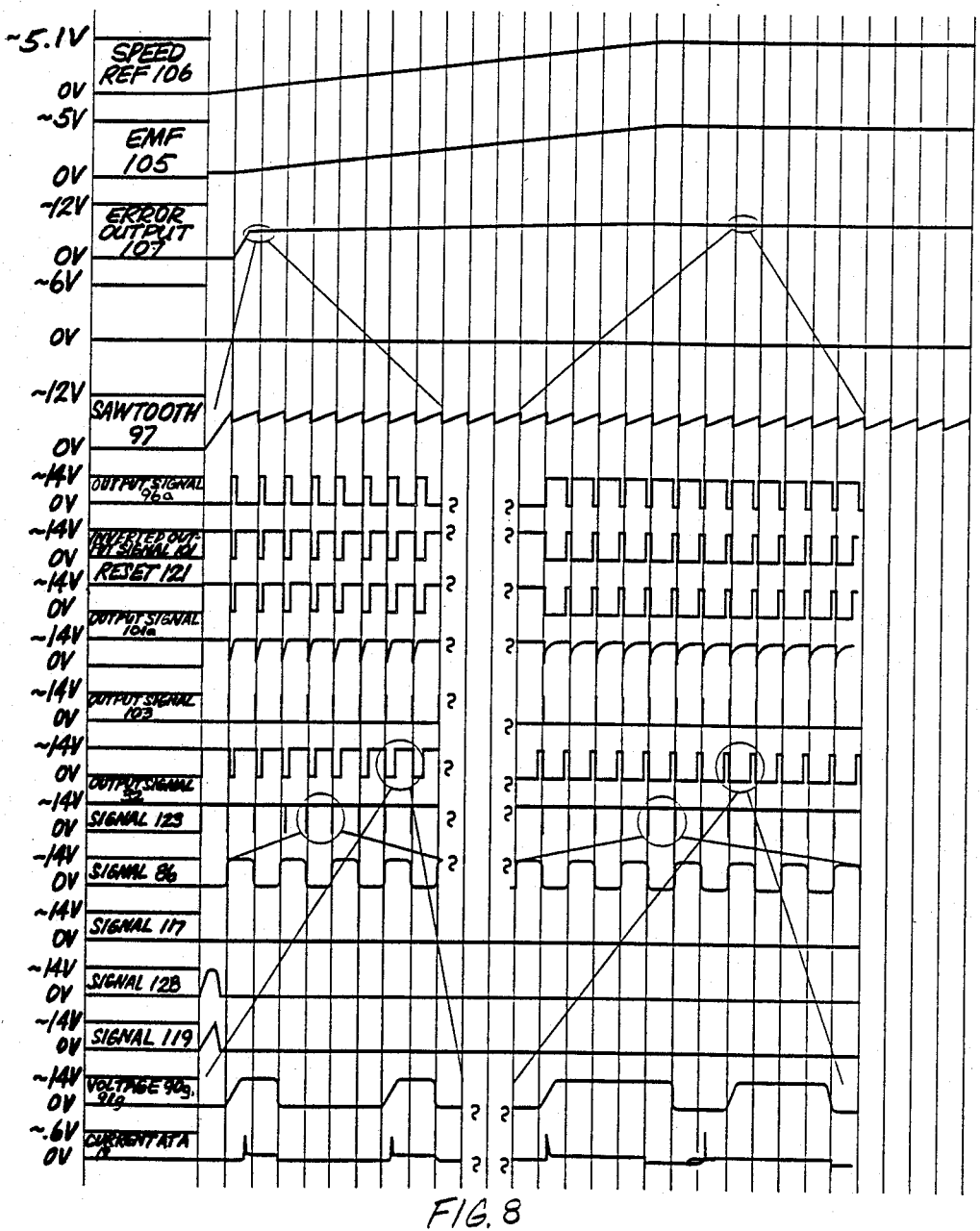
FIG. 8 is a timing diagram of the various wave forms involved from the start up of the control system to full speed, light load operating conditions.

In order to more clearly understand the operation of the circuit, reference is now made to FIG. 8 which represents the various wave forms of the circuit during normal operation. The circuit is initially switched on and motor 18 is accelerated from start to full speed at a light load. Signals 105 and 106, the voltage feedback signals and reference speed input, respectively, increase and reach peak value after about 10 seconds following control turn on. Signal 107 output from amplifier 104 reaches a value commensurate with full speed, light load values under normal conditions quickly. To provide a more comprehensive understanding of the timing sequence, the portion of the timing diagram below the signal 107 waveform has been expanded. Thus, the sawtooth signal 97 which may have a frequency of 18 kilohertz can be adequately portrayed. The output signal 96a of comparator 96 can be seen to be on the leading edge of saw tooth signal 97. Initially signal 96a is of short duration, but increases as the motor speed is increased. The same is true of the inverted output signal 101 and the reset signal 121. As can be seen, signal 101a, the output of invertor 102 and the output pulse or signal 103 to the set pin of flip-flop 94 have a short duration, the latter being about 0.5 microseconds.

It is clear that the interval of time that the signal 121 is low continually increases as the motor speed approachs full speed. During this time interval, $\overline{Q}$ is low and the clock signal 86a from clock generator 86 continues to clock F/F 85; signal 32 increases in duration as speed increases. The voltage on gates 90g, 91g is also shown in further expanded form showing a rise from 0 volts to 14 volts in about 5 microseconds, a fall in about 3 microseconds with approximately 55 microsecond interval at 18 Khz.

The right hand position of the timing diagram of FIG. 8 indicates the sequence occuring at full motor speed with a light load. The pulse width of signal 96a reflects the high speed of the motor and it may be seen that gates 90g and 91g are conducting much longer than before resulting in a concommitant increase in motor current as detected at the A-terminal.

Figure 9:
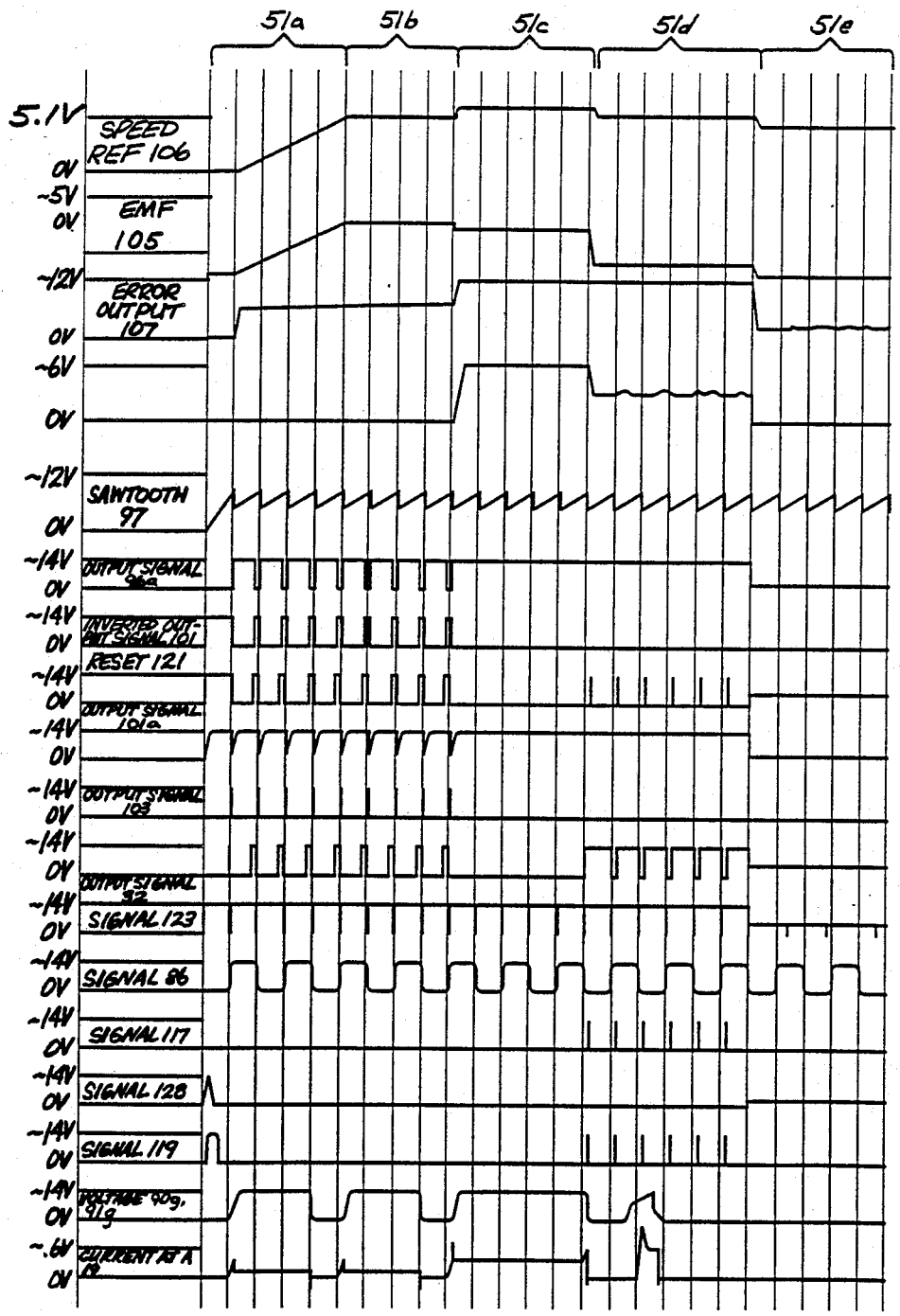
FIG. 9 is a timing diagram of the various wave forms involved from the start up of the control system to full speed, full load operating conditions and, additionally, including abnormal conditions due to overload and low control voltage.

FIG. 9 is a timing diagram similar to FIG. 8 in that the wave forms at start up and full speed, light load are shown. Additionally, however, wave forms are illustrated which occur when the motor is at full speed with fully rated load, when an overload is applied in current limit mode, and when a component fails resulting in undervoltage of the control circuit. Brackets 51a–e depict the underlying portion of the diagram applying to each event mentioned above with bracket 51a portraying start up and bracket 51b portraying full speed, light load.

The portion of the diagram under bracket 51c illustrates the motor running at full speed and full load. The signal output 96a is continuously high. Similarly, the output 32 from $\bar{Q}$ is continuously low resulting in gates 90g, 91g being essentially continuously conductive. When an overload is experienced, however, as under bracket 51d, error signal 117 appears high briefly as does the output signal 119 which resets flip-flop 94, resulting in the intermittent reduction in voltage on gates 90g and 91g and in the temporary stalling of motor 18. The timing sequence occurring when the control voltage drops below a predetermined level is shown under bracket 51e. Signal 128 is shown going high, resulting in signal 121 remaining high, resetting flip-flop 94 until the control voltage returns to normal. As may be seen, the voltage at gates 90g, 91g becomes too small and the motor current 19 is shut down.

With some application it may be desireable and acceptable to eliminate certain components of the control circuit. For example, SCR 82 and relay 84 may be eliminated if external switch 130 (see FIG. 1) to turn on the circuit is not desired. Thus, when a.c. current is applied to input 10, the control turns on and remains on until such time as the fault circuit is triggered. In such instance, SCR 81 clamps control voltage to about 3 volts d.c., disabling SCR 52 and SCR 53, cutting off the capacitor bank 54 voltage which in turn causes the low voltage circuit 124 to be activated as described above.

If it is desired to reduce the rated horsepower, then the resistance of resistor 116a may be lowered, for example, from the rated 8.25 K ohms to 3 K ohms to lower the current limit reference to amplifier 116 and the capacitance of 73b to 0.1 microfarads (see FIG. 4) increased to provide greater stability in the event of an overspeed shutdown of the circuit described in FIG. 4. Additionally, MOSFET 91 may be eliminated since MOSFET 90 is able to provide the total armature current for the motor. Also one of resistors 18a or 18b shown in parallel may be eliminated due to the lower current requirements.

It will be understood that the foregoing description is of a preferred exemplary embodiment of the present invention and that the invention is not limited to the specific forms shown. Modifications may be made in design and arrangement thereof within the scope of the present invention, as expressed in the appended claims.

I claim:

1. A control circuit for operating and controlling a d.c. motor comprising:
   (a) means for producing a d.c. signal to a d.c. motor;
   (b) pulse width modulator means for generating a pulse width modulated signal; said pulse width modulator means including:
      (i) means for generating a pulse width signal of constant frequency,
      (ii) means responsive to said pulse width signal for generating a square wave signal, and
      (iii) means for rectifying said square wave into said pulse width modulated signal, said rectifying means further including a transformer means and bridge means responsive to said square wave signal generating means for providing said pulse width modulated signal;
   (c) power switch means in response to said pulse width modulated d.c. signal for selectively interrupting said d.c. signal to said motor, said power switch means including at least one MOSFET-type transistor wherein a source thereof is connected to a positive lead to said motor and a gate thereof is connected to said pulse width modulator means, said gate being ground referenced to said source.

2. The circuit of claim 1 further comprising an error signal generating means for sensing the d.c. voltage at said positive lead of said motor and generating a signal proportional to the sense of voltage in response thereto, means for providing a predetermined speed reference signal, means for comparing said proportional signal to said speed reference signal and generating an error signal which is proportional to the difference between said first signal and said speed reference signal, said pulse width modulator means in response to said error signal generating a pulse width proportional to said error signal.

3. The circuit of claim 2 including a means for sensing current at a point on a negative lead from said motor and generating a second signal proportional to the sense of current, said comparing means summing said second signal and said speed reference signal to produce said error signal proportional to the difference between said second signal and said speed reference signal and said first signal.

4. A control circuit for operating and controlling a d.c. motor comprising:
   (a) means for producing a d.c. signal to a d.c. motor, said d.c. signal generating means being connected to an a.c. line input and further including
      (i) rectifying means for rectifying a.c. signal received from said input into a d.c. signal,
      (ii) capacitor means for providing smooth d.c. signal to said motor, and
      (iii) rectification control means responsive to a voltage on said capacitor means different from a reference voltage for causing said rectifier means to rectify said a.c. input signal during a point cycle of the a.c. input to bring said voltage of said capacitor means within a predetermined voltage range,
   (b) pulse width modulator means for generating a pulse width modulated signal;
   (c) power switch means in response to said pulse width modulated d.c. signal for selectively interrupting said d.c. signal to said motor; said power switch means including at least one MOSFET-type transistor wherein a source thereof is connected to a positive lead to said motor and a gate thereof is connected to said pulse width modulator means, said gate being ground referenced to said source.

5. The circuit of claim 4 in which said disabling means is responsive to said control voltage exceeding a predetermined value for disabling said control voltage means.

6. The circuit of claim 4 wherein said rectification control means includes programable unijunction transistor means for providing a control pulse to said rectifier means and zener diode means tied to a gate providing low impedance to said gate.

7. A control circuit for operating and controlling a d.c. motor comprising:
   (a) means for producing a d.c. signal to a d.c. motor;
   (b) power switch means in response to a pulse width modulated signal for selectively interrupting said d.c. signal to said motor;

(c) control means for generating a control signal, said d.c. signal means being fully operative only in the presence of said control signal;

(d) means for producing a preselected signal when said d.c. signal exceeds a predetermined reference value; and (e) disabling circuit means for producing a disabling signal in response to said preselected signal, said control means becoming inoperative in response to said disabling signal and said d.c. signal producing means reducing the level of said d.c. signal.

8. The circuit of claim 7 including a potentiometer switch means for turning on said control means.

9. The control circuit of claim 7 in which said means includes a comparator means for producing a preselected signal for comparing said d.c. signal with said predetermined reference value and said control means includes a means responsive to said disabling signal for shutting off said control signal.

10. A control circuit for operating and controlling a d.c. motor comprising:

(a) means for producing a d.c. signal to a d.c. motor;

(b) power switch means in response to a pulse width modulated signal for selectively interrupting said d.c. signal to said motor;

(c) control means for generating a control signal, said d.c. signal means being fully operative only in the presence of said control signal;

(d) means for producing a preselected signal when said control signal exceeds a predetermined reference value; and (e) disabling circuit means for producing a disabling signal in response to said preselected signal, said control means becoming inoperative in response to said disabling signal and said d.c. signal producing means reducing the level of said d.c. signal.

* * * * *